(No Model.) 2 Sheets—Sheet 2.
P. E. McDONNELL.
TOY.

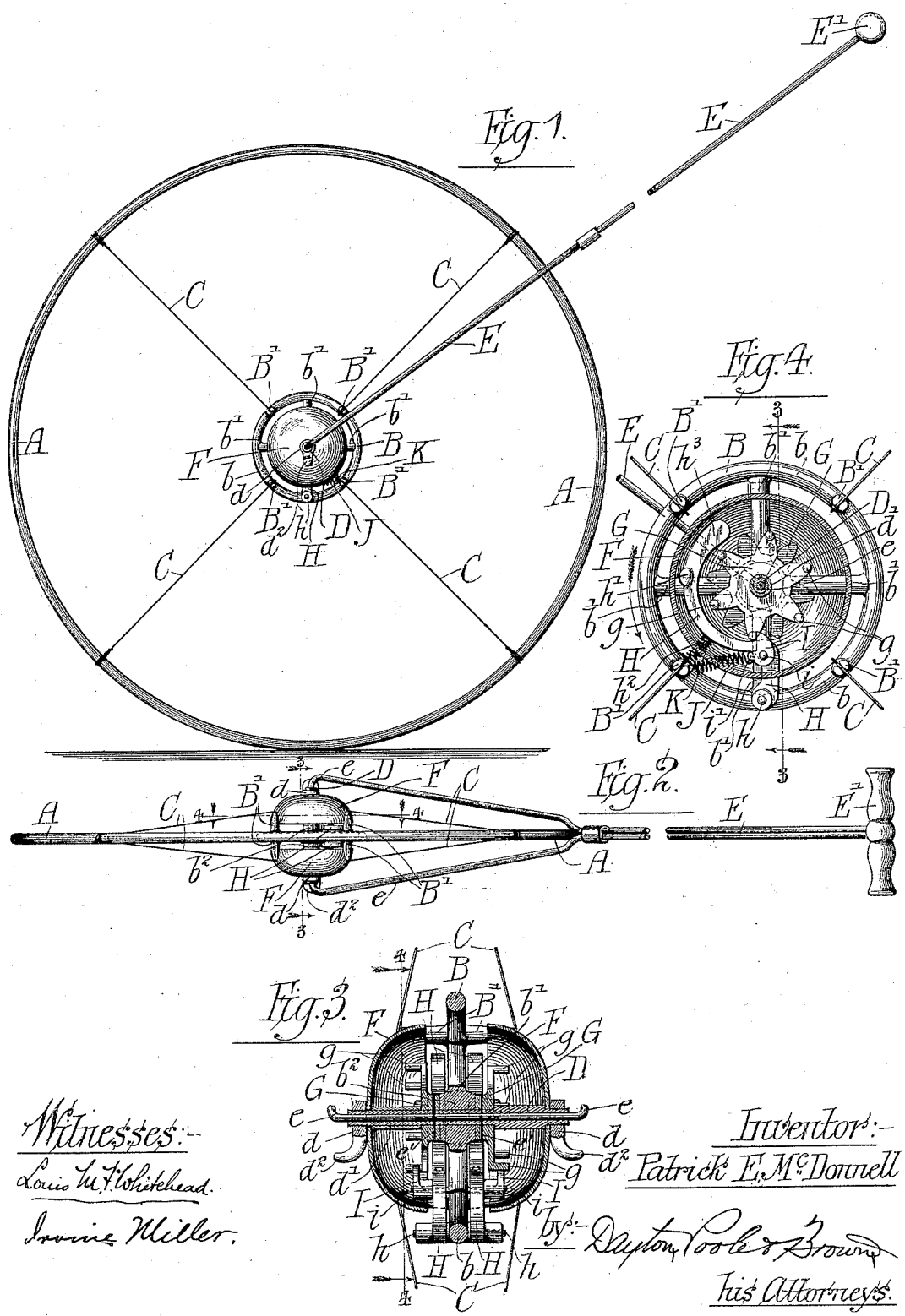

No. 493,895. Patented Mar. 21, 1893.

Witnesses:—
Louis M. F. Whitehead.
Ironie Miller.

Inventor:—
Patrick E. McDonnell
by Dayton, Poole & Brown
his Attorneys.

UNITED STATES PATENT OFFICE.

PATRICK E. McDONNELL, OF CHICAGO, ILLINOIS, ASSIGNOR, BY DIRECT AND MESNE ASSIGNMENTS, TO JOHN F. WAITE AND ANGELINA M. CLARKE, OF SAME PLACE.

TOY.

SPECIFICATION forming part of Letters Patent No. 493,895, dated March 21, 1893.

Application filed June 30, 1891. Serial No. 398,014. (No model.)

*To all whom it may concern:*

Be it known that I, PATRICK E. McDONNELL, of Chicago, in the county of Cook and State of Illinois, have invented certain new and useful Improvements in Toys; and I do hereby declare that the following is a full, clear, and exact description thereof, reference being had to the accompanying drawings, and to the letters of reference marked thereon, which form a part of this specification.

This invention relates to improvements in toys of that class embracing a wheel to which is attached a bell or bells arranged for operation by the turning of the wheel.

The invention consists in the matters hereinafter described and pointed out in the appended claims.

Figure 5:
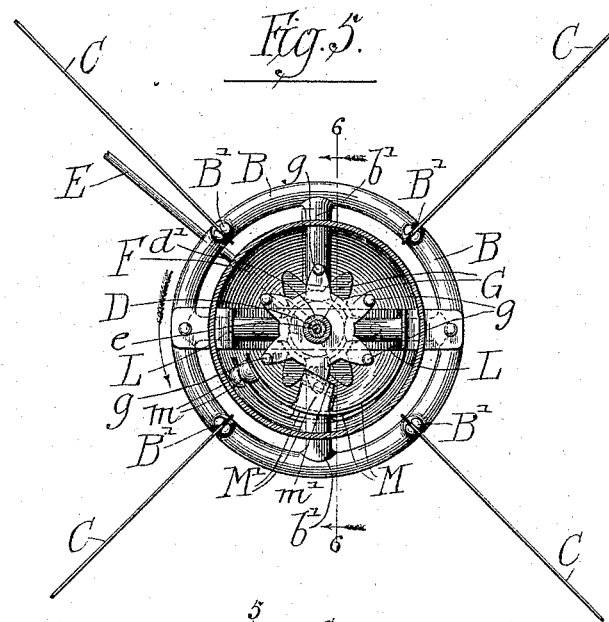
Figure 6:
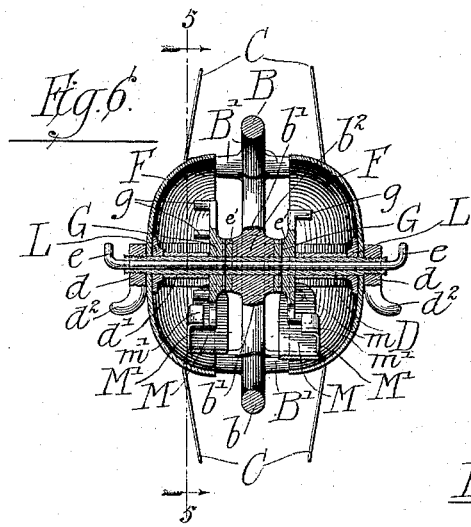

In the accompanying drawings: Figure 1 is a side view of a device embodying my invention. Fig. 2 is a plan view of the same. Fig. 3 is an enlarged detail section taken upon line 3—3 of Figs. 2 and 4, showing the bell and devices for operating the same. Fig. 4 is a sectional elevation taken upon line 4—4 of Figs. 2 and 3. Fig. 5 is a sectional elevation taken upon line 5—5 of Fig. 6, showing a modified construction in the bell ringing device. Fig. 6 is a sectional view of the same taken upon line 6—6 of Fig. 5.

As shown in said drawings, A indicates the wheel rim which may be of any suitable construction but which as herein shown consists of a cylindric rod or wire bent in circular form.

B is a central flat disk which forms in effect the hub of the wheel. Said disk as herein shown is for lightness and convenience cast with an annular rim $b$, a series of spokes $b'$ $b'$ and a central hub $b^2$.

Attached to the rim of the disk B is a series of arms B' B' extending outwardly from each side of the disk in a direction perpendicular to the plane thereof or parallel with the axis of rotation of the wheel.

C C are spokes extending from the outer ends of the said arms B' B' to the wheel rim A, said spokes being preferably but not necessarily arranged in pairs with the two spokes composing each pair extending from a single point on the rim in an outwardly direction to the ends of the opposite arms B' B', which in the instance illustrated are arranged in alignment with each other. The arms B' B' are shown as cast integral with the disk B and the spokes as made of wire and fastened to the rim A by being bent or twisted around the same, but these details are not essential and the arms may be otherwise constructed and the spokes otherwise secured or attached to the parts.

As a simple and convenient way of securing the spokes to the arms B' B' the latter are notched in their outer ends and the opposite spokes C C are formed by a single rod or wire which is carried from the outer rim inwardly through the notch in the end of one arm lengthwise of the two arms to the notch in the other arm and thence outwardly to the wheel rim, and, inasmuch as this affords a construction possessing important advantages in point of simplicity, cheapness and ease of construction, it is herein claimed as part of my invention.

D indicates a rod or axle on which the wheel turns, said axle being inserted through a central bearing aperture in the hub $b^2$ of the disk B.

E is a bar which is held in the hand while the wheel is rolled or trundled on the ground, said bar being provided with prongs $e\,e$ which extend through and are secured within the hollow axle D by pins $e'$. A cross bar or handle E' is preferably attached to the outer end of the said bar E for convenience in grasping the said bar. The axle D being rigidly attached to the prongs $e\,e$ is non-rotating while the wheel turns on said axle.

F F are two gongs or bells mounted upon the axle D with their hollow sides inward and adjacent to each other, the inner margins of the bells being placed close to the disk B so that the bells come partially or wholly within the arms B' B' upon said disk, it being obvious that by the employment of the said flat disk provided with arms, as above described, recesses are provided at the center of the wheel to accommodate the said bells or gongs so that the latter may be mounted on the axle, as described, without making the same unduly long. The bells or gongs F are preferably secured to the axle D and are thereby held against rotation.

G G are disks secured to the axle D at either side of the hub $b^2$ and within the spaces inclosed by the gongs, said disks being provided with a series of lateral pins or projections $g\ g$ arranged in annular order. In the particular construction illustrated the disks G G are provided with hubs through which the axle D is inserted and are secured to the axle by the pins $e'$ passing through said parts, in the manner illustrated. The gongs F F are shown as held in place by means of nuts $d\ d$ on the outer ends of the axle D which clamp the gongs against shoulders formed on the axle D. As shown, said nuts are provided with arms or lugs, $d^2$, whereby they may be conveniently tightened or removed. At one end of the axle said shoulder is formed by an enlargement upon the same while at the opposite end a separate sleeve $d'$ is placed upon the axle between the disk G and the bell, in the manner illustrated (Fig. 3).

H H are swinging levers pivoted upon opposite sides of the disk B by means of pivot pins $h\ h$ located preferably adjacent to the margin of said disk. Attached to the said levers H H near their free ends, are lugs $h'\ h'$ which form hammers to act upon the gongs.

I I are pawls pivoted to the levers H H at points near the pivot pins $h$ and extending inwardly in the path of the pins $g\ g$ of the disks G G. Said pawls I I are mounted on pivot pins $i$ which are secured in the levers H H, and each of said pawls is provided with an arm $i'$ adapted to extend past and engage the adjacent edge of the lever H so as to limit the movement of the pawl in one direction and hold the same in position for contact with the pins $g\ g$. A spirally coiled spring J is attached to the arm $i'$ of each of the pawls I I and extends to and is connected with an adjacent part of the disk B, said spring for convenience being shown as connected with one of the arms $B'$. The springs J J serve to actuate both the pawls I I and the levers H H to which said pawls are attached, said springs being so disposed and arranged as to draw and hold the arms $i'\ i'$ of the pawls against the levers so as to hold said pawls positively in position for engagement with the pins $g\ g$ while at the same time said springs exert a tension on the levers H H in a direction to carry the free ends of the same outwardly or toward the inner surfaces of the gongs. The said pawls I I are so located and arranged with reference to the pins $g\ g$ that when the disk B carrying the said levers is revolved the pawls are brought against the said pins $g$ and the free ends of the levers thereby drawn backwardly or inwardly until the levers are thrown so far inwardly that the pawls escape from the said pins. The springs J J are expanded when the free ends of the arms H H are thus drawn inwardly and the contraction of said springs draws the arms quickly outward so as to bring the hammers $h'\ h'$ in contact with the gongs. The said levers H H are held normally in position with the hammers thereon free from contact with the gongs by means of coiled springs K K which are placed around radial pins $h^2\ h^2$ on the outer surfaces or edges of the said levers and which extend beyond said pins and bear at the outer ends against opposing surfaces of the disk B, such opposing surfaces being herein shown as formed by the arms $B'\ B'$ opposite which the springs K K are for convenience located. Said springs K K are obviously adapted to yield under the impetus of the arms when the pawls I I are released from the pins $g\ g$, thereby allowing the hammers $h'\ h'$ to come in momentary contact with and give a quick stroke against the gongs. The levers H H are shown as extended past the hammers $h'\ h'$ and thickened to form weighted ends $h^3\ h^3$ which serve to give increased force to the blow struck by the hammers when the levers are released.

The pawls I I are employed in order to prevent the gongs from being sounded except when the wheel is turned in one direction, the parts being so arranged that when the direction of rotation of the wheel is reversed so that the pins $g\ g$ strike the rear or inclined surface of the pawls I I said pawls will be swung upon their pivots in a direction to carry the stops $i'\ i'$ away from contact with the levers H H and thus allow the pins to move freely past the pawls without moving the levers H H. The pins $g\ g$ belonging to the disks G G are preferably not arranged in line with each other, but the pins on one disk are placed in intermediate angular positions with relation to those on the other disk so that the two gongs will be swung in alternation as the wheel revolves.

From the above description of the construction of the device illustrated it will be obvious that a still further advantage is gained by the employment of the flat disk B provided with arms for the attachment of the spokes, such advantage being that the disk affords a means of support for the devices employed to operate the hammer for sounding the gongs, which devices are located between the gongs and the said disk and partially within the gongs, and the gongs together with the devices for sounding the same are located in a small compass and give little bulk or thickness at the central part of the wheel.

In Figs. 5 and 6 I have shown a somewhat different construction in means for operating the hammers of the gongs. In this instance the gongs F F are connected and turn with the disk B, said gongs beings attached to yoke pieces L L which are secured at their ends to said disk instead of being attached directly to the axle, as hereinbefore described. In this construction the axle D passes through suitable apertures formed in the yoke pieces and gongs in the manner clearly shown in the drawings. Disks G G are employed similar to those hereinbefore described but in place of the swinging levers spring arms M M are attached to the yoke pieces L L and are provided at their free ends with hammers $m\ m$ to strike the inner surfaces of the gongs, the resiliency of the spring arms M M being relied upon to throw the hammers outwardly against the gongs.

M' M' are plates extending inwardly from the spring arms M M, said plates being provided with inwardly bent flanges $m'\ m'$ which are inclined with reference to the radial lines of the wheel and are adapted for engagement with the pins $g\ g$ of the disks G G. In this construction said pins act on the inclined flanges $m'\ m'$ in a manner to draw the spring arms M inwardly, and as the pins pass the ends of the flanges they release the spring arms and allow the hammers to spring outwardly against the gongs.

I claim as my invention—

1. The combination with a wheel-rim, of a central disk provided with laterally projecting arms arranged opposite each other and notched at their ends, and spokes consisting of wires resting in said notches and attached at their ends to the wheel-rim; each pair of spokes being formed of a single wire carried through the notch in one arm, and lengthwise of the two opposite arms, and through the notch in the opposite arm, substantially as set forth.

2. The combination, with a wheel consisting of a rim, a central disk provided at its margin with lateral arms forming central recesses at the sides of the disk and spokes extending from the ends of said arms to the rim, and with an axle on which said wheel turns, of a gong-bell supported concentrically with the axle at the side of said disk and within the said recesses formed by said arms, a hammer, and means actuated by the relative movement of the wheel and axle for operating said hammer, substantially as described.

3. The combination with a wheel consisting of a rim, a central disk provided at its margin with lateral arms, forming central recesses at the sides of the disk and spokes extending from the ends of the said arms to the wheel-rim, and with an axle on which said wheel turns, of two gong-bells arranged at the sides of the disk and within the said recesses formed by said arms, said bells being centrally apertured for the passage of the axle, and a bar for moving the wheel, provided with two prongs engaging said axle outside of the said bells, substantially as described.

4. The combination with a wheel consisting of a rim, a central disk provided at its margin with lateral arms, forming central recesses at the sides of the disk and spokes extending from the ends of said arms to the wheel-rim, and with an axle on which the wheel turns, of a gong-bell supported at the side of the disk within the said recesses formed by said arms and centrally apertured for the passage of the axle, a hammer and actuating devices therefor located between the bell and the disk, and a means for moving the wheel engaging the axle outside of the bell, substantially as described.

5. The combination with a wheel and axle on which the wheel turns, of a gong-bell supported concentrically with the axle and centrally apertured for the passage of the latter, a hammer, and means for operating the hammer, comprising a disk attached to the axle and provided with pins giving movement to the hammer in the turning of the wheel, substantially as described.

6. The combination with a wheel and an axle on which it turns, of a gong-bell mounted concentrically with the axle, a hammer, a spring-actuated arm or lever supported by attachment to the wheel, and a disk attached to the axle and provided with pins engaging said arm or lever for operating the hammer, substantially as described.

7. The combination with a wheel comprising a central flat disk and a rim connected therewith, and with an axle on which the wheel turns, of a gong-bell sustained at the side of said disk concentrically with the axle, a hammer, a spring-actuated arm or lever mounted on said disk and a disk attached to the axle and provided with pins adapted to engage and actuate said arm or lever for operating the hammer, substantially as described.

8. The combination with a wheel and axle on which it turns, of a gong-bell, a spring-actuated lever provided with a hammer, a pawl mounted on the lever, and a disk provided with pins acting on the said pawl, said lever and disk being connected one with the wheel and the other with the axle, whereby they are relatively moved in the turning of the wheel, substantially as described.

9. The combination with a wheel and axle and gong-bell, of a lever H provided with a hammer, a pawl mounted thereon, a spring J throwing the lever in one direction, a spring K to limit the movement of the lever, and a disk provided with pins acting on the said pawl to move said lever, substantially as described.

10. The combination with the bell and lever H provided with the stud $h^2$, of the spring K placed on said stud, the spring J for moving the lever H, and means for moving said lever against the action of said spring J, substantially as described.

11. The combination, with the bell, and lever H, of the pawl I pivoted thereto, and the spring J connected with said pawl and actuating both the pawl and the lever H, substantially as described.

12. The combination with a wheel and axle on which it turns, said axle having tubular ends, of gong-bells mounted on the axle, nuts securing the bells on the axle and a bar provided with prongs having inwardly bent ends engaging the axle, said nuts having arms adapted to strike said prongs to prevent the axle from turning, substantially as described.

In testimony that I claim the foregoing as my invention I affix my signature in presence of two witnesses.

PATRICK E. McDONNELL.

Witnesses:
C. CLARENCE POOLE,
IRVINE MILLER.